Oct. 25, 1960 F. D. COVELY 3RD 2,957,941

SYSTEM FOR NARROW-BAND TRANSMISSION OF PICTORIAL INFORMATION

Filed Oct. 1, 1954 8 Sheets-Sheet 1

INVENTOR.
Frank D. Covely, 3rd
BY J. L. Whittaker
ATTORNEY

Oct. 25, 1960 F. D. COVELY 3RD 2,957,941

SYSTEM FOR NARROW-BAND TRANSMISSION OF PICTORIAL INFORMATION

Filed Oct. 1, 1954

8 Sheets-Sheet 2

INVENTOR.
Frank D. Covely, 3rd
BY J. C. Whittaker
ATTORNEY

INVENTOR.
Frank D. Covely 3rd
BY J. L. Whittaker
ATTORNEY

SYSTEM FOR NARROW-BAND TRANSMISSION OF PICTORIAL INFORMATION

Filed Oct. 1, 1954

8 Sheets-Sheet 4

INVENTOR.
Frank D. Covely, 3rd
BY J. L. Whittaker
ATTORNEY

SYSTEM FOR NARROW-BAND TRANSMISSION OF PICTORIAL INFORMATION

Filed Oct. 1, 1954

8 Sheets-Sheet 5

INVENTOR.
Frank D. Covely, 3rd
BY J. L. Whittaker
ATTORNEY

SYSTEM FOR NARROW-BAND TRANSMISSION OF PICTORIAL INFORMATION

Filed Oct. 1, 1954 8 Sheets-Sheet 6

INVENTOR.
Frank D. Covely, 3rd
BY J. L. Whittaker
ATTORNEY

SYSTEM FOR NARROW-BAND TRANSMISSION OF PICTORIAL INFORMATION

Filed Oct. 1, 1954 8 Sheets-Sheet 7

INVENTOR.
Frank D. Covely 3rd
BY J. L. Whittaker
ATTORNEY

INVENTOR.
Frank D. Covely, 3rd
BY J. L. Whittaker
ATTORNEY

United States Patent Office 2,957,941
Patented Oct. 25, 1960

2,957,941

SYSTEM FOR NARROW-BAND TRANSMISSION OF PICTORIAL INFORMATION

Frank D. Covely 3rd, Haddonfield, N.J., assignor to Radio Corporation of America, a corporation of Delaware Filed Oct. 1, 1954, Ser. No. 459,711
18 Claims. (Cl. 178—6.8)

This invention relates to the transmission of pictorial intelligence by electrical signals and, more particularly, to an improved system for decreasing the band-width of such transmission while maintaining good pictorial resolution.

In a television camera pickup tube, such as an iconoscope, a scene or image is optically projected upon a light-sensitive mosaic within the tube, and the mosaic is scanned by an electron beam. The total scanned area, usually rectangular in shape, will be termed hereinafter the "scanned area," "picture area" or simply "picture." The imaged scene or object will be termed the "image," "image area," "video image," "pictorial intelligence" "pictorial information" or "video information."

It is known that the frequency band-width necessary to afford good picture resolution in a television system, for example, is proportional, among other things, to the number of picture elements scanned per second (e.g., see Television Simplified, Kiver, 3rd ed., pp. 34–38). The requisite band-width can be decreased by reducing the speed of scanning so that fewer picture elements are scanned each second. This would not be practical in the case of commercial television where it is necessary to transmit a minimum number of complete picture fields each second, due to the physiological factors of the human eye, but it is practical to facsimile systems, or systems for the transmission of data displayed on a radar screen, where the pictorial information to be transmitted is relatively stable with respect to time, and the duty cycle (i.e., amount of pictorial information or image elements in proportion to the total scanned area) is low.

Decreasing the band-width necessary to transmit pictorial information allows utilization of ordinary inexpensive telephone line or wire cable as the link between a transmitting and receiving point in a closed intelligence-transmission system, whereas wideband transmission of such information requires the employment of expensive waveguide or coaxial transmission circuits. Furthermore, narrow-band circuits and systems are generally simpler and more economical to construct than wide-band circuits.

A primary object of this invention is to provide an improved system for transmitting pictorial information having good resolution in conjunction with narrow band-width.

Another object is to provide an improved system which permits telephone lines or ordinary wire cable to be employed in transferring pictorial or video information between a transmitter and a receiver.

A further object is to provide an improved system for increasing the speed of facsimile transmissions.

The foregoing objects and advantages are accomplished in accordance with the present invention by utilizing a rapid speed of scan over portions of the picture in which video information is lacking and a slow speed of scan over portions of the picture area which contain video information, or detail. The slow scanning rate over the latter portions permits good resolution even though the band-width is narrow, while the rapid scanning rate over the remainder of the picture permits a rapid average rate of scanning for each complete picture.

The general method employed to control the rate of scan is based on the use of two scanning beams, separated by a fixed time interval. The first beam, which is called the sampling beam, is used to predict when the second, or reading beam, will reach areas containing video information to control the scanning speed of the reading beam. When the output obtained from the sampling beam during the course of its scanning contains video information, the B+ voltage supplied to the deflection circuits is decreased, thereby reducing the rate of scan; when the output obtained from the sampling beam contains no video information, the deflection circuit voltage is returned to its normal value, thereby increasing the rate of scan. The fixed time interval between the two beams corresponds to the time required to decrease the speed of the reading beam after the sampling beam encounters an area containing video information, so that the reading beam will be traveling at reduced speed when it encounters this same area.

A preferred embodiment of the invention employs a variation of the general system in which the functions of the sampling and reading beams are accomplished by means of a single scanning beam. A small sine-wave voltage is superimposed upon the horizontal beam deflection voltage, thereby alternately advancing and retrograding the scanning beam from the position it would assume under the sole influence of the horizontal scanning voltage. By employing a sorting circuit which is operative only at those times at which the beam is located at its maximum advanced and maximum retrograded positions, two sets of video signals are obtained from the output of the beam. Signals obtained while the beam is in its maximum advanced positions correspond to the sampling beam signals of the basic system, while signals obtained while the beam is in its maximum retrograded positions correspond to the reading beam signals. The sorting circuit also functions to separate these two sets of signals, the sampling signals and the reading signals, from each other. If so desired, the electron gun may be pulsed so that a beam is produced only while the sorting circuit is operative. The remainder of the single-beam system operates in the same general manner as the double-beam system.

The invention will be described in greater detail with reference to the accompanying drawing, in which.

Figure 4:
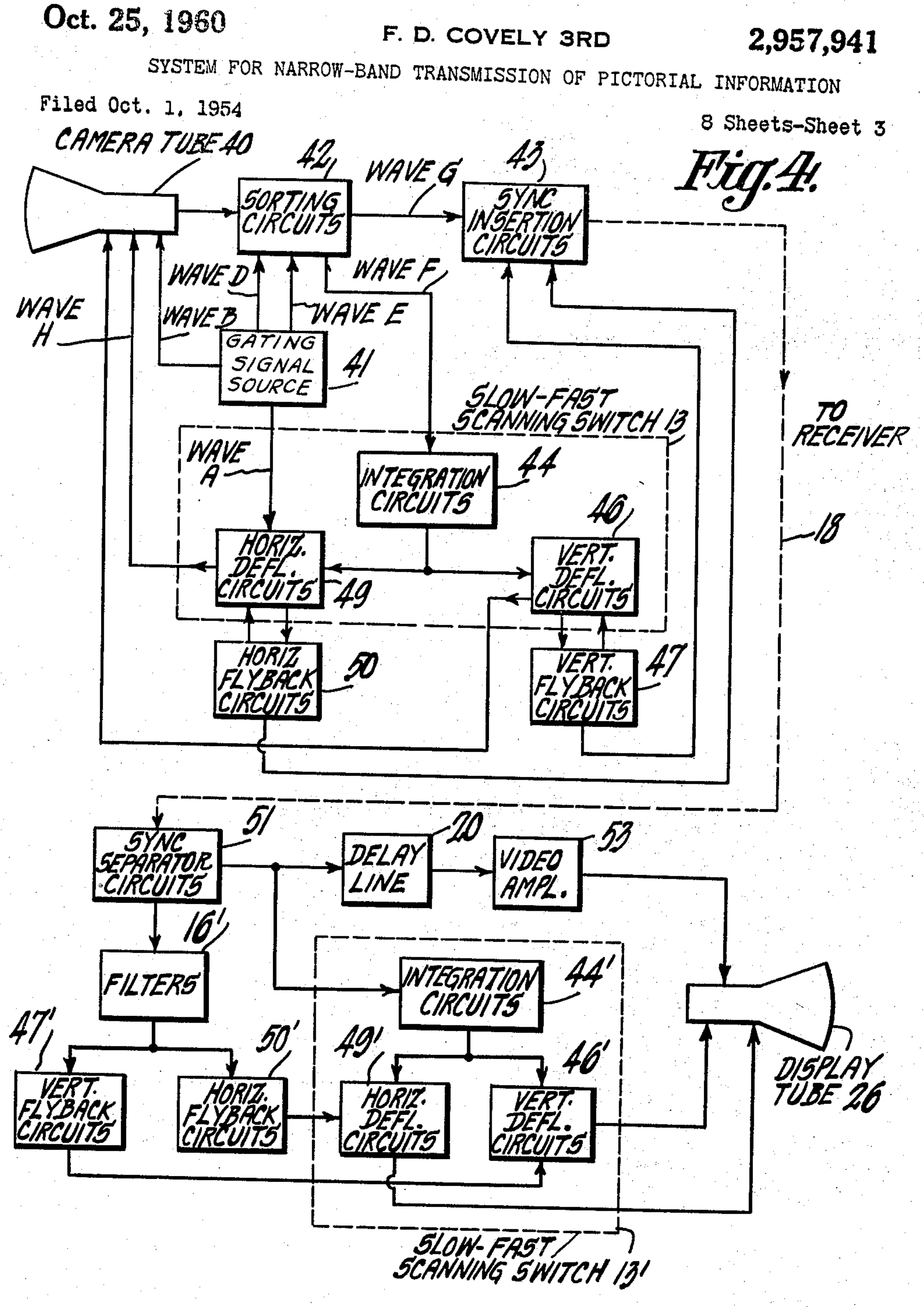
Figure 4 is a block circuit diagram of a preferred embodiment of the invention, utilizing a single image-pickup device.
Figure 6:
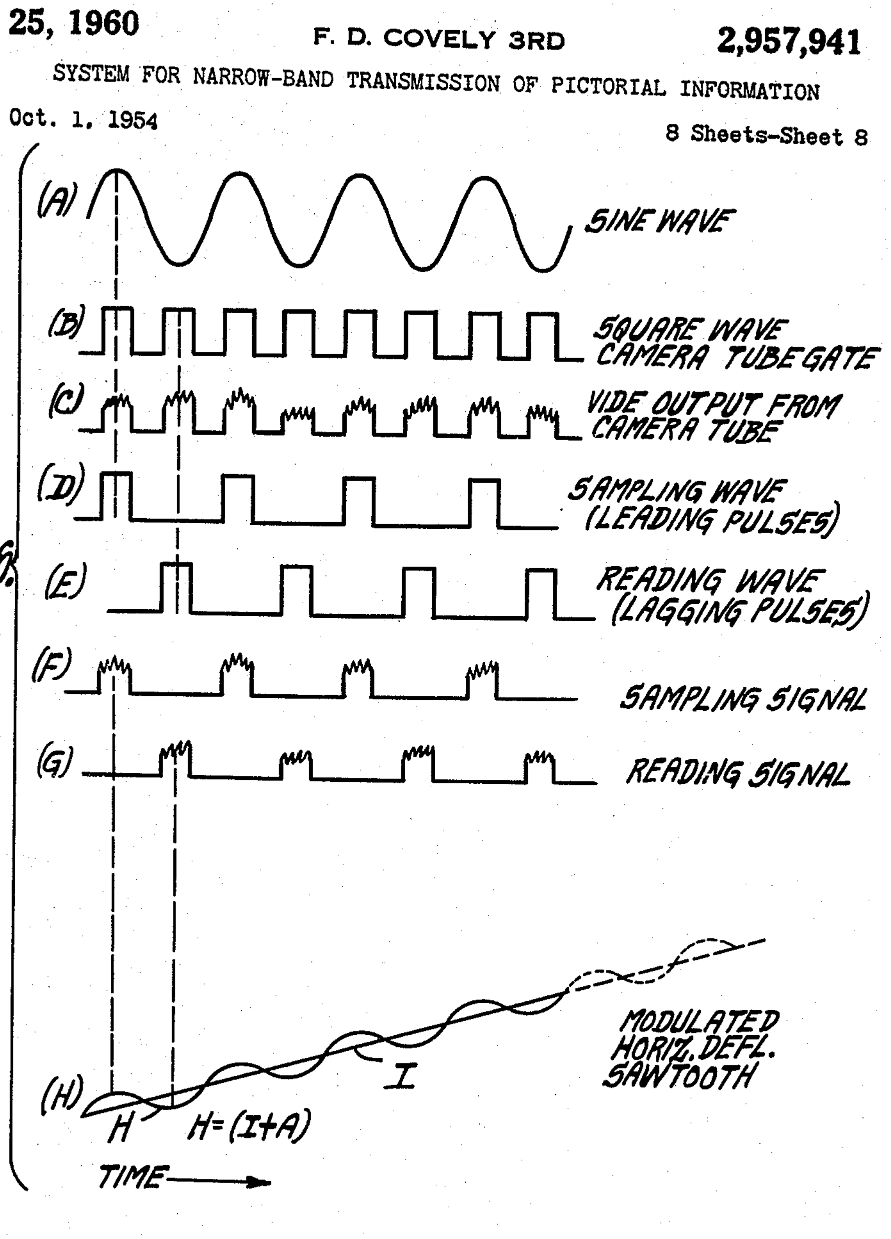

Figures *5a* to *5d* show a schematic circuit diagram of the transmitter section of the preferred embodiment of the invention, blocked out by dashed lines to correspond to the blocks shown in Figure 4; and Figure 6 is a series of waveforms at various points in the circuit of the embodiment illustrated in Figure 4, which aid in understanding the operation of the invention.

In the drawings, similar reference characters refer to similar elements and primed reference characters are applied to elements having similar circuitry and functions to those elements designated by identical but unprimed reference characters.

*System I.—Transmitter using two camera tubes*

Figure 1:
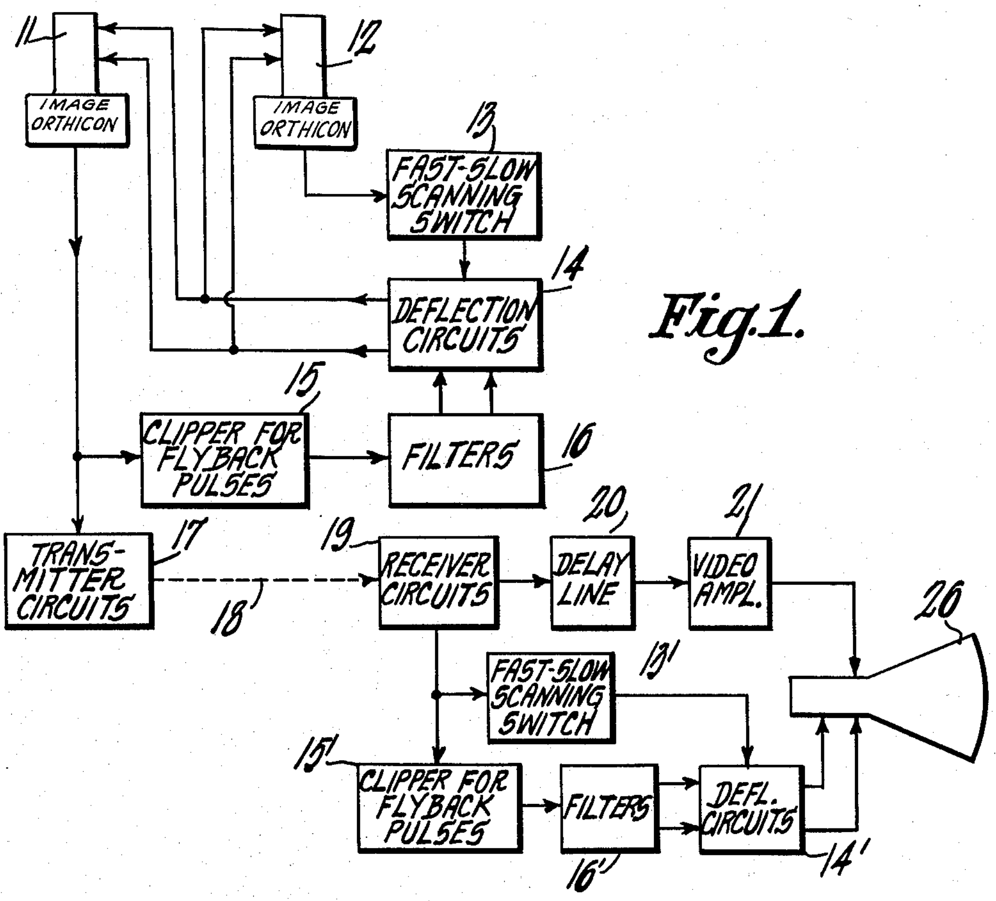
Figure 1 is a block circuit diagram of a system in accordance with this invention which can be used to transmit pictorial information obtained from a non-translucent picture subject, such as the face of a radar display tube.

Figure 1 illustrates one embodiment of apparatus for automatically varying speed of scan in accordance with the presence or absence of pictorial intelligence. A pair of image orthicon television camera tubes 11 and 12 are located so that the identical image is focused on the mosaic plate of each tube. The scanning beam of one camera tube 12 is positioned by means of its centering controls so that it precedes the scanning beam of the other camera tube 11 by a small, fixed time interval. Hereafter, the leading beam will be called the sampling beam and the lagging beam will be called the reading beam. Both beams are deflected in synchronism with each other by the same deflection voltages.

The speed at which a beam scans across the picture area depends upon the value of the B+ voltage toward which the deflection sawtooth wave is charging—the higher the value of the B+ voltage, the faster will be the speed of scan. Under normal conditions, the B+ voltage toward which the deflection sawtooth wave charges, in accordance with the invention, is high, and the speed of scan of the beam is therefore rapid. However, as soon as the sampling beam contacts the edge of an area of the picture which contains pictorial intelligence, or detail, a video voltage will appear in the output of its camera tube 12. This video voltage is coupled to the fast-slow scanning switch 13, a circuit which, when video voltage is present at its input, reduces to a lower value the B+ voltage to which the deflection sawtooth wave is charging, thereby reducing the speed of scan. The scanning voltage is coupled from the deflection circuits 14 to both camera tubes 11 and 12.

The reason the reading beam is set to lag the sampling beam is because a small, but finite, amount of time is consumed in altering the speed of the scan due to RC charge and discharge time constants of the deflection circuits 14. Therefore, this time interval must be present between the two beams so that the speed of the reading beam can be reduced before it reaches the edge of any area containing pictorial information. Of course, the converse applies to increasing the speed of scan when an area lacking pictorial intelligence is reached.

The video voltage output from the camera tube 11 is coupled to the transmitter circuits 17, which may merely be one or more narrow-band amplifiers if the signals are being sent to the receiver over a transmission cable 18, rather than being transmitted through space by radio. If radio transmission is employed, the transmission circuit 18 includes a radio transmitter and radio receiver, not shown. The video voltage output is also coupled to a clipper circuit 15.

Figure 2:
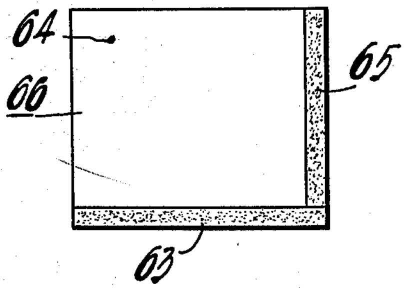
Figure 2 is a diagram of a mosaic plate of a camera tube employed in conjunction with this invention.

The video voltage output includes pulses of greater amplitude than the video signals. These flyback pulses are generated each time the reading beam passes the extreme right edge of the picture area in the course of its horizontal scannings, and each time the reading beam passes the lower edge of the picture area in the course of its vertical scannings. As shown in Figure 2, the mosaic plate 66 of the camera tube, across which the electron beam spot 64 scans, has at its right edge a strip 65 of metal having higher secondary emission than the material comprising the emissive dots on the mosaic plate 66. This metal strip 65, and the strip 63 along the lower edge may be composed of material such as Kovar. Thus, the horizontal flyback pulse is a relatively short, high-intensity pulse, while the vertical flyback pulse is a long, high-intensity pulse.

The clipper circuit 15 to which the video output voltage is coupled is set at such a level that only the flyback pulses pass through and are amplified. The flyback pulses are fed to resistor-condenser filters 16 which differentiate between horizontal and vertical pulses on the basis of duration and couple them to the horizontal and vertical deflection circuits, respectively. Each horizontal pulse quickly discharges the condenser employed to generate the horizontal deflection voltage, thereby bringing the scanning beam back to its starting position at the left side of the picture area. The vertical pulses accomplish an equivalent result in the vertical deflection circuit, bring the scanning beam up to the upper edge of the picture area.

*Receiver*

At the receiving end of the cable or radio circuit 18, the video voltages and pulses are coupled through the receiver amplifying circuits 19 to a delay line 20, a fast-slow scanning switch 13', and a clipper circuit 15'.

The fast-slow scanning switch 13' has the same function and structure as the one used in conjunction with the camera tubes 11 and 12. When video signals are present at its input, it reduces the B+ voltage supplied to the deflection circuits 14', thereby reducing the speed of scan. Again, a finite time is required to vary the speed of scan due to the RC time constants of the charge and discharge circuits of the deflection circuits. To compensate for this, a delay line 20 is inserted in the path of the video signals, so that the speed of the scan will be altered before the video information is displayed on the kinescope 26.

After being delayed for a time interval equal to the time required to alter the speed of scan, the video signals are fed to a video amplifier 21, and thence to the kinescope 26, where they are displayed on the screen.

The horizontal and vertical deflection circuits 14' are synchronized with those in the transmitter by the flyback pulses which are clipped from the composite video and pulse voltage signal fed to the clipper circuit 15' by the receiver amplifier circuits 19. Again, the horizontal and vertical flyback pulses are separated from each other by the filters 16' and coupled respectively to the horizontal and vertical deflection circuits.

*System II.—Transmitter using flying spot scanners*

Figure 3:
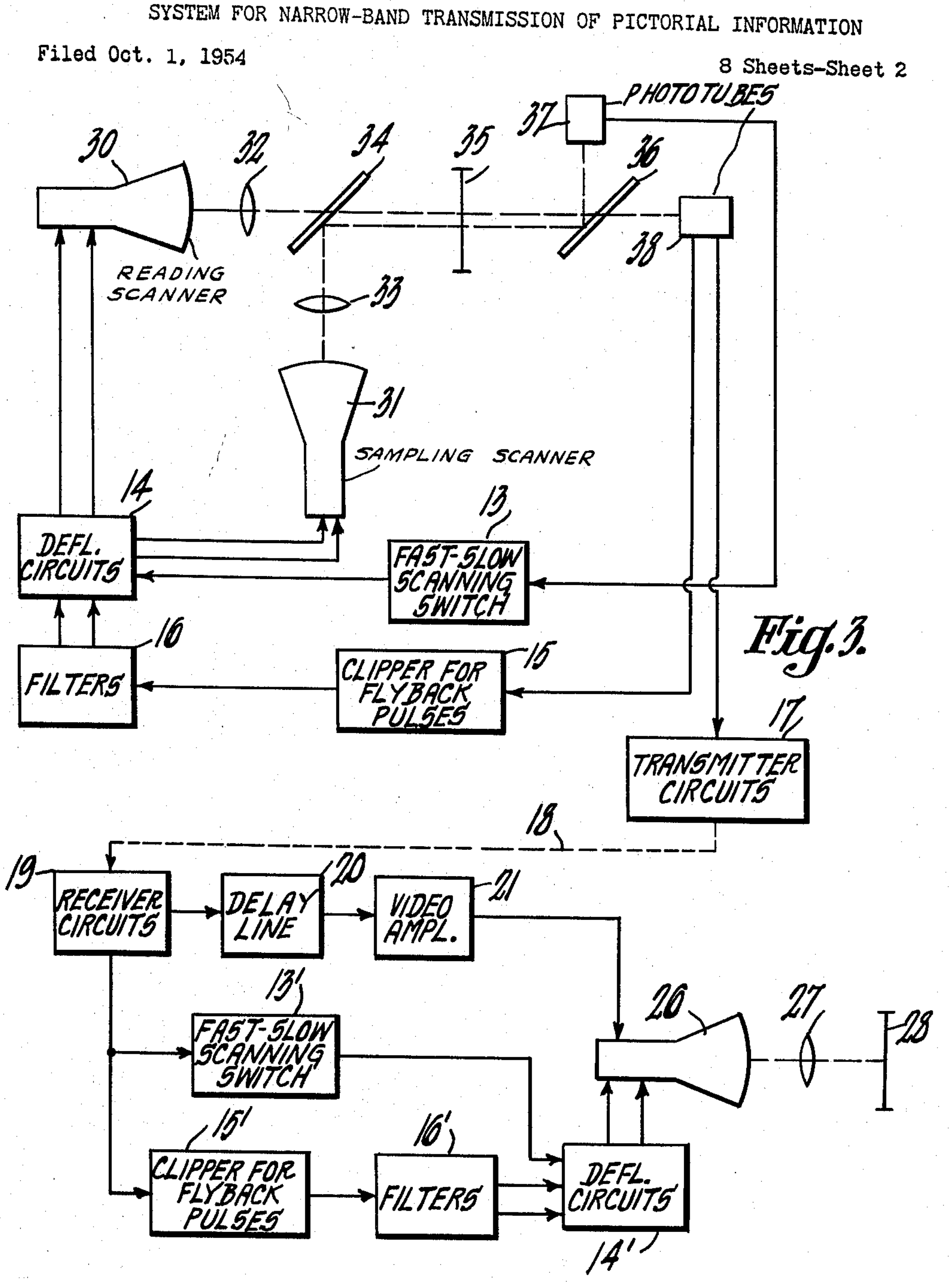
Figure 3 is a block circuit diagram of a system in accordance with this invention which can be used to transmit pictorial information obtained from a translucent picture subject, such as a photographic film.

Referring to Figure 3, a pair of flying spot scanners 30 and 31, which may be kinescopes with short persistence and high light output screens, face an optical system comprising lenses 32, 33, and selective-reflective mirrors 34, 36. The scanning spot on the screen of the reading scanner 30 is projected through the film 35 onto reading phototube 38, and the scanning spot of the sampling scanner 31 is projected through the film 35 onto the sampling phototube 37. The centering controls of the sampling scanner 31 are adjusted so that its spot precedes the spot of the reading scanner 30 by a small time interval, as explained in connection with the embodiment shown in Figure 1.

The output of the reading phototube 38 corresponds to the output of camera tube 11 in Figure 1, and the output of the sampling phototube 37 corresponds to that of camera tube 12 in Figure 1. The operation of the remaining transmitter and receiver circuits of the present embodiment is identical with those of the embodiment shown in Figure 1, except that the output kinescope 26 has a short-persistence, high-light output screen, so that the spot may be projected and recorded upon film 28 by a lens system 27, if so desired.

If the phosphors on the screens of both flying spot scanners 30 and 31 are identical, so that the color of both light beams is the same, the selective-reflective mirrors 34, 36 referred to above may be dichroic reflectors. The dichroic reflectors are constructed to transmit light of one color and reflect light of another color so that, after passing through the first dichroic reflector 34, the transmitted, or reading, beam from the reading scanner 30 is colored differently from the reflected, or sampling, beam from the sampling scanner 31. Transmission of the beams to their proper phototubes is accomplished by the second dichroic reflector 36 in accordance with the same principle. Thus, the separation of the sampling from the reading information in the flying spot method depends upon color discrimination.

Half-silvered mirrors may be employed instead of dichroic reflectors if the phosphors of the scanners 30 and 31 emit light of different colors. In this event, it is necessary to place suitably colored filters in front of the phototubes 37 and 38. Thus, if the light emitted by the scanner 30 were blue and that emitted by the scanner 31 were red, it would be necessary to place a red filter in front of phototube 37 and a blue filter in front of phototube 38. The red filter admits the red light from the sampling beam scanner 31 and rejects the blue light from the reading beam scanner 30; the blue filter admits the blue light from the reading beam scanner 30 and rejects the red light from the sampling beam scanner 31. Various other optical arrangements may be utilized to accomplish the same result.

Other types of camera tubes, such as vidicons, or storage tubes, may, of course, be employed in place of image orthicons, and storage tubes or kinescopes with high-persistence screens such as the P-7 type, may be employed if the picture is to be observed directly rather than recorded on film.

If vidicons are substituted for the orthicon camera tubes, strips of high photo-conductivity, rather than high photo-emissivity, must be employed to produce the flyback pulses. Another method of generating flyback pulses where strips of photographic film form the subject matter for transmission is to employ thin strips of clear film at the right side and bottom of each frame, in a manner similar to the employment of the photo-emissive strips 63 and 65 in Figure 2. A further method of generating flyback pulses is to utilize the output of a small pickup coil in the deflection yoke to trigger a blocking oscillator, or similar device, when the mangetic field of the yoke reaches some arbitrary value.

*System III.—Transmitter using single camera tube*

Figure 4 is a block diagram of a preferred embodiment of the invention. Here, a single camera tube 40, such as a vidicon, replaces the pair of pickup devices of the systems of Figures 1 and 3.

The gating circuits 41 generate four output signals. The first is a sine wave A (see Figure 6, waveform A) the frequency of which is high compared to that of the horizontal deflection sawtooth. As an example, the sine wave may have a frequency of the order of 10,000 cycles per second for a horizontal sawtooth frequency of the order of 120 cycles per second. The second signal is a square wave B (see Figure 6, waveform B) of twice the frequency of the sine wave A and having positive-going pulses which coincide with the points of maximum and minimum amplitude of the sine wave A. The third signal is the sampling wave D (see Figure 6, waveform D), a series of rectangular pulses which coincide with the points of maximum positive amplitude of the sine wave and whose duration is of the order of one-quarter of the period of the sine wave. The fourth output signal is the reading wave E (see Figure 6, waveform E), a series of rectangular pulses of the same type as the third signal D, but which coincide with the points of (maximum negative) amplitude of the sine wave A.

The sine wave A is applied to the horizontal deflection circuits 49 and superimposed upon the horizontal deflection sawtooth (see Figure 6, waveform H). This continually advances and retrogrades the position of the scanning beam from the average position it would assume if only the horizontal deflection sawtooth I were applied.

The signal output of the camera tube 40 is applied to the sorting circuits 42, which comprise several class A amplifiers in series with a pair of gated amplifiers. These gated amplifiers are normally cut-off, but one is caused to conduct by the application of the sampling pulses D, and the other by the application of the reading pulses E. The output of the former gated amplifier, which may be called the sampling signal F (see Figure 6, waveform F), is thus a series of video pulses, each obtained at a time when the scanning beam is in an advanced position corresponding to the maximum amplitude of one cycle of the sine wave. Similarly, the output of the latter gated amplifier, which may be called the reading signal G (see Figure 6, waveform G), is a series of video pulses, each obtained at a time when the scanning beam is in a retarded position corresponding to the minimum amplitude of one cycle of the sine wave. Thus, the sampling signal F and the reading signal G in this embodiment are functionally similar to the sampling and reading beam outputs of the systems illustrated in Figures 1 and 3.

When video signals are present, the sampling signal F is in the form of pulses having an overall video-modulated envelope. In the integration circuits 44, the pulses are filtered out and the envelope is applied to a shaping circuit the output of which is a pulse of the same duration as the video signals. This pulse is applied to both horizontal and vertical deflection circuits 49 and 46, and acts to reduce the rate of scan, as hitherto described.

Flyback pulses are produced in this embodiment by triggering a pulse generator at some pre-set amplitude of deflection voltage. Both horizontal and vertical flyback pulses are obtained in this manner and are applied respectively to the horizontal and vertical deflection circuits causing the deflection voltages to return to their starting values.

The flyback pulses are also coupled to the synch-insertion circuits 43 where they are mixed with the reading signal to form a composite signal containing positive-polarity video signals and negative-polarity flyback pulses. A telephone line or radio circuit may be used to couple the composite signal to the receiver, as described previously.

*System III.—Receiver*

At the receiver, the composite signal is coupled to the synch separator circuits 51 which separate the video signals from the flyback pulses. The video signals are then coupled through a delay line 20 and video amplifier 53 to a kinescope display tube 26, as described in the embodiment illustrated in Figure 3.

The flyback pulses are coupled to resistor-condenser filters 16′, which separate the horizontal from the vertical pulses by virtue of the difference in their duration, and apply the pulses to their respective amplifying and reshaping circuits, which are included in the blocks labelled horizontal and vertical flyback circuits 50′ and 47′. The flyback pulses are then coupled to the horizontal and vertical deflection circuits 49′ and 46′, respectively, thereby synchronizing the receiver scanning with the transmitter scanning. It may be possible to couple the flyback pulses directly to the horizontal and vertical deflection circuits without employing amplifying and reshaping circuits, depending upon the length or characteristic of the line or circuit between the transmitter and receiver.

It will be noted that the slow-fast scanning switch 13 in the transmitter has been broken down in Figure 4 into components comprising the integration circuits 44, horizontal deflection circuits 49 and vertical deflection circuits 46. This has also been done for the switch 13' in the receiver.

*System III.—Schematic circuit-transmitter*

Referring to Figure 5, the detailed schematic circuits for the transmitter have been grouped in blocks corresponding to those in Figure 4.

Such a detailed schematic circuit diagram has not been provided for the receiver since the receiver circuits indicated by primed reference characters are similar to corresponding transmitter circuits indicated by unprimed reference characters. Before describing the transmitter circuits, it may be mentioned that the synch separator circuits 51 (Figure 4) are an amplifier and a pair of clipper circuits, as, for example, described on pages 158–161 of the War Department Technical Manual TM11–466, Radar Electronic Fundamentals, published June 29, 1944.

Figure 5A:
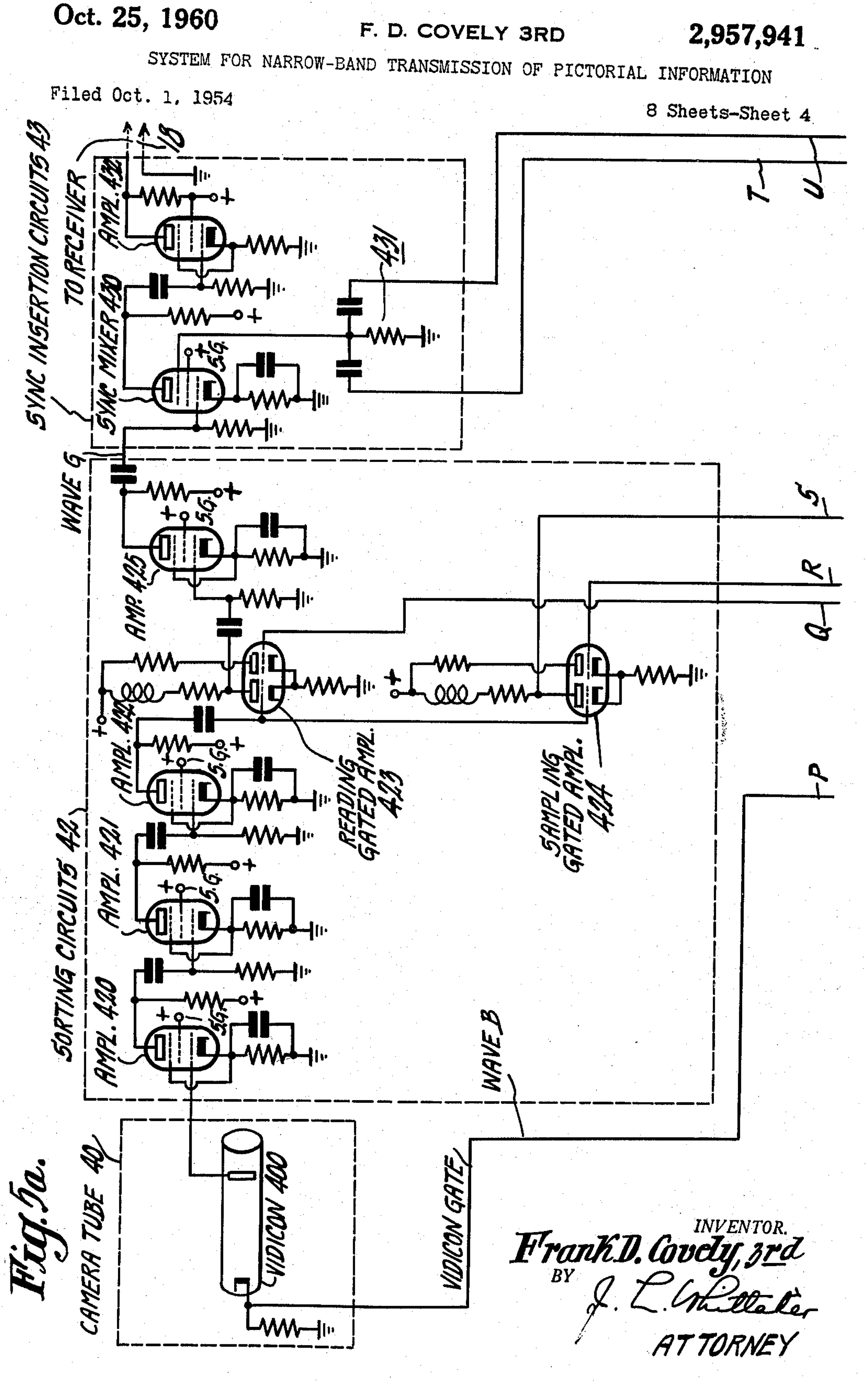
Figure 5B:
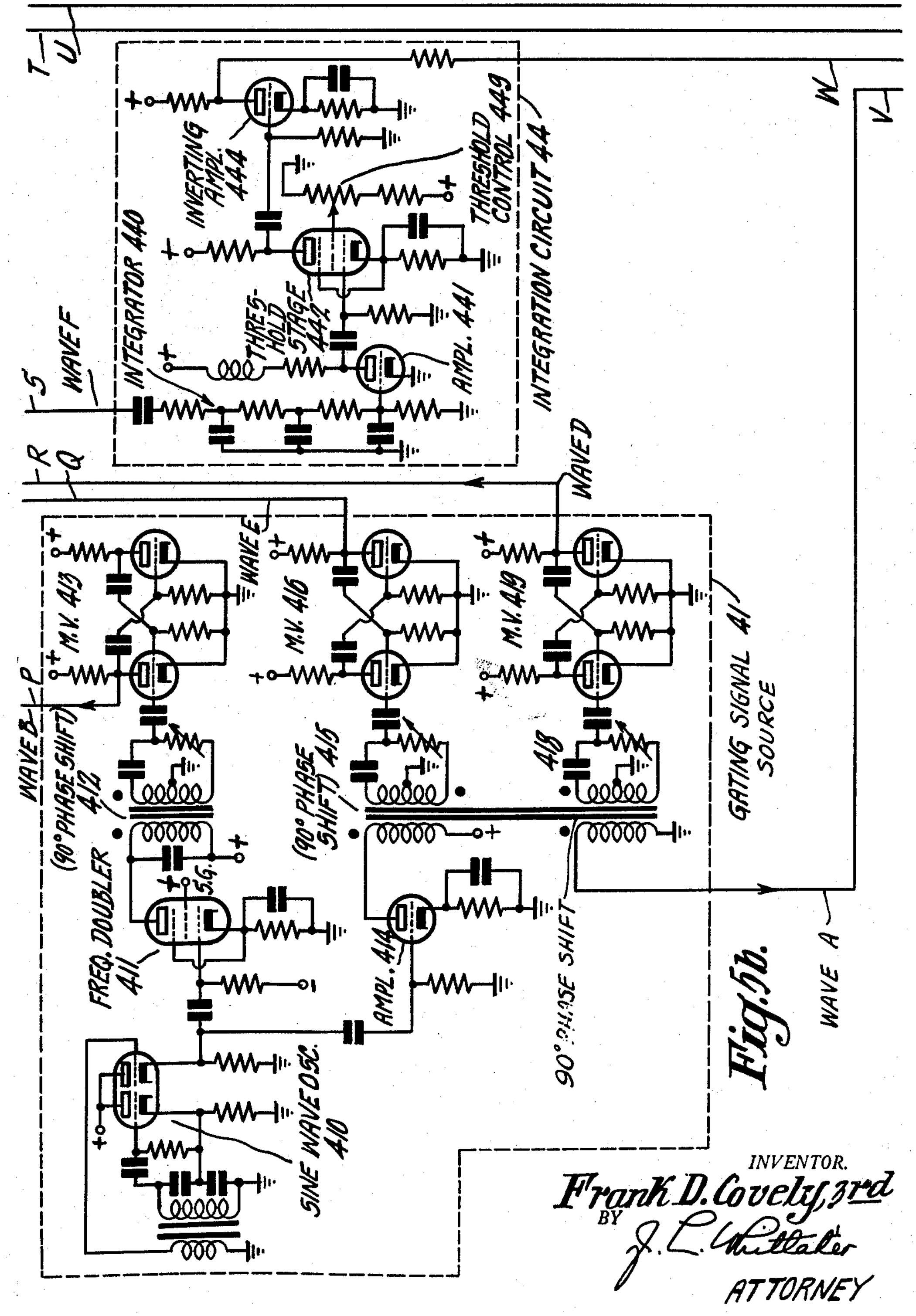
Figure 5C:
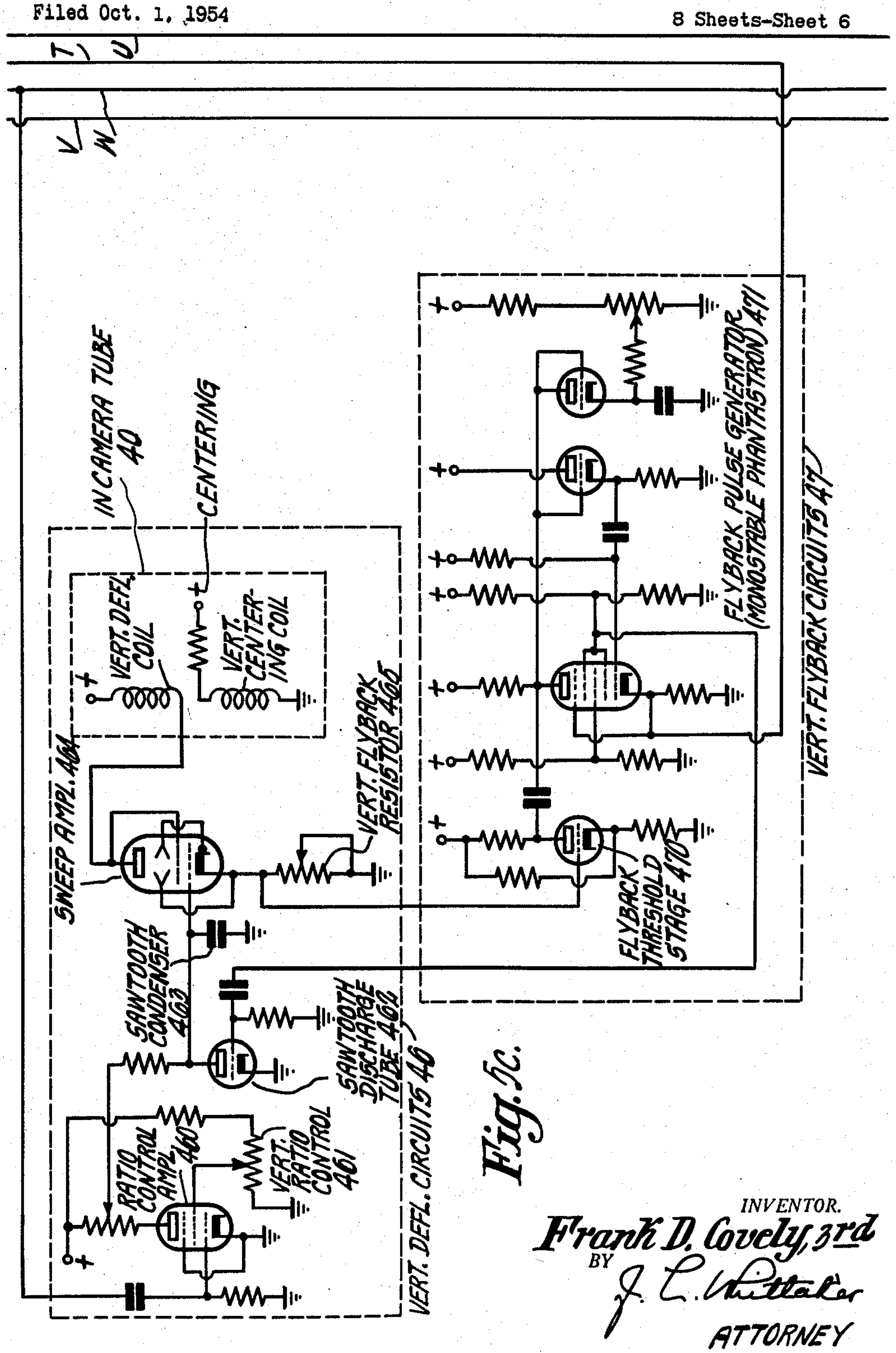

Referring to Figure 5*b*, gating circuits 41 comprise a sine wave oscillator stage 410 coupled to a frequency doubler 411, whose output is fed through a transformer and 90° phase shifting network 412 to a multivibrator 413. The square wave output of the multivibrator 413 (see Figure 6, waveform B) is coupled to the camera tube 400 (see Figure 5*a*), where it gates the electron beam on and off. Gating the camera tube 400 is not essential but is preferable.

The sine wave output of the oscillator 410 is also coupled through an amplifier 414, a transformer and a pair of 90° phase shifting networks 415 and 418 to a pair of multivibrators 416 and 419. Another winding on this same transformer couples a sine wave A (see Figure 6, waveform A) of the same frequency as that of the oscillator 410 to the mixing amplifier 494 (see Figure 5*d*) in the horizontal deflection circuits 49, where it modulates the horizontal deflection sawtooth (see Figure 6, waveform H). The output of the multivibrator 416 is the reading wave E (see Figure 6, waveform E) and is coupled to the control grid of the reading gated amplifier 423 (Fig. 5*a*) in the sorting circuits 42 (Fig. 5*a*). The output of multivibrator 419 (Fig. 5*b*) is the sampling wave D (see Figure 6, waveform D) and is coupled to the control grid of the sampling gated amplifier 424 (Fig. 5*a*).

Referring to Figure 5*a*, the gated output of the camera tube 400 (see Figure 6, waveform C) is coupled through several amplifier stages 420, 421, and 422 to the reading gated amplifier 423 and the sampling gated amplifier 424 in the sorting circuits 42. The output of the reading gated amplifier 423 (see Figure 6, waveform G) is further amplified by an amplifier stage 425.

Referring to Figure 5*a* once again, the output of the sampling gated amplifier 424 (see Figure 6, waveform F) is coupled to the integrator network 440 (Fig. 5*b*) in the integration circuits 44, which filters out the pulses and feeds the video modulation envelope through the amplifier stage 441 to the threshold stage 442. The video modulation envelope is negative-going at the grid of the threshold stage 442, which is essentially a limiting amplifier. The output of the threshold stage 442 is a positive-going rectangular pulse, limited at the top by cut-off and at the bottom by plate saturation. The threshold control, a variable resistor, determines the value of the screen grid voltage, and thus controls the point at which the plate saturates. The duration of this rectangular pulse is equal to the duration of the video signals.

The output pulse of the threshold stage 442 (Fig. 5*b*) is coupled through an inverting amplifier 444 (Fig. 5*b*) via lead W to both the vertical ratio control amplifier 460 (Fig. 5*c*) in the vertical deflection circuits 46 and to the horizontal ratio control amplifier 490 (Fig. 5*d*) in the horizontal deflection circuits 49.

The vertical sawtooth condenser 463 (Fig. 5*c*) derives its charging voltage from a point on the plate resistor of the vertical ratio control amplifier 460. In the absence of a rectangular video pulse on the grid of the ratio control amplifier 460, the sawtooth condenser 463 will charge at a certain rate. When a positive-going rectangular video pulse is impressed on the grid of the vertical ratio control amplifier 460, its plate current increases and the charging voltage fed to the vertical sawtooth condenser 463 decreases. The condenser 463 then charges at a reduced rate. Thus the deflection sawtooth voltage increases at one of two rates, the slower rate being in effect when video signals are present in the output of the camera tube 400. The horizontal ratio control amplifier 490 (see Figure 5*d*) operates in the same manner to reduce the rate of charge of the horizontal sawtooth condenser 493.

When the rates at which the sawtooth condensers 463 and 493 charge are reduced, they must be reduced proportionately so that the slope at which the electron beam in the camera tube 400 is crossing the screen will not be altered. The vertical ratio control 461 and the horizontal ratio control 491, variable resistors which adjust the screen grid voltages of their respective ratio control amplifier 460 and 490 determine the amount of current that flows through the amplifiers 460 and 490 for a given value of grid signal and therefore determine the voltage that is tapped off the plate resistors and coupled to the sawtooth condensers 463 and 493. The setting of the ratio control resistors 461 and 491 thus determines the rate of charge of the sawtooth condensers 463 and 493.

The vertical deflection sawtooth voltage from the vertical sawtooth condenser 463 (Fig. 5*c*) is coupled to the vertical sweep amplifier 464 whose plate current is impressed on the vertical deflection coil in the camera tube 40. When the voltage across the cathode resistor of the vertical sweep amplifier 464 reaches a pre-set level it triggers the flyback threshold stage 470, which is normally cut-off. The sudden decrease in plate voltage of the flyback threshold stage 470 triggers, in turn, the flyback pulse generator 471, a monostable phantastron circuit, which generates the vertical flyback pulse. A phantastron circuit is employed to generate the vertical pulse since a pulse of long duration is required.

The vertical flyback pulse is coupled back to the grid of the vertical sawtooth discharge tube 462, causing it to conduct and thereby discharge the vertical sawtooth condenser 463.

Figure 5D:
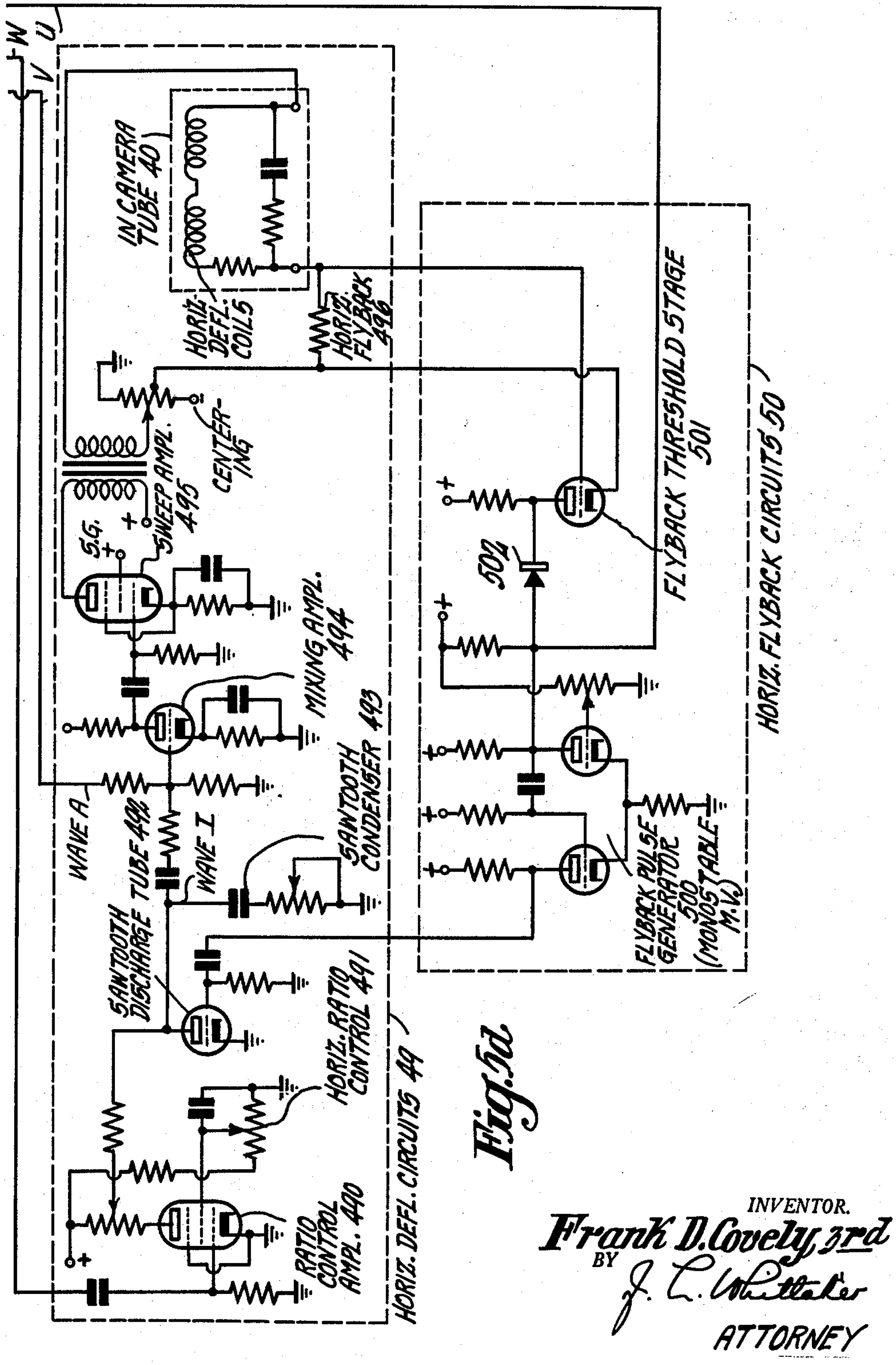

Referring to Figure 5*d*, the function of the horizontal flyback pulse circuits is similar although the circuits themselves are somewhat different. A simpler flyback pulse generator 500 (a monostable multivibrator) may be employed in the horizontal circuit since the horizontal flyback pulse is of shorter duration than the vertical.

Also, since direct drive of the horizontal deflection coils cannot be effectively utilized due to the relatively high frequency of the horizontal deflection sawtooth, the horizontal flyback resistor 496 cannot be placed in the cathode circuit of the horizontal sweep amplifier 495. It is placed, instead, in series with the horizontal deflection coils and the secondary of the output transformer of the horizontal sweep amplifier 495.

The horizontal flyback resistor 496 is employed as the cathode resistor for the horizontal flyback threshold stage 501. The direction of the deflection current through the flyback resistor 496 is such that it opposes the bias which maintains the flyback threshold stage 501 in a normally cut-off condition. At some predetermined level during the rise in the value of the deflection current, the flyback threshold current starts to conduct and allows current to flow from the source of B+ voltage through the plate resistor of the second half of the flyback pulse generator 500 and through the rectifier crystal 502, thereby dropping the value of plate voltage of the second half of the flyback pulse generator 500. This drop in plate voltage is coupled to the grid of the first half of the flyback pulse generator 500, which is normally conducting, and cuts it off, thereby raising its plate voltage. A positive pulse is thereupon produced at the plate of the first half of the flyback pulse generator 500 (a monostable multivibrator) and a negative pulse at the plate of the second half. The positive pulse is impressed upon the grid of the horizontal sawtooth discharge tube 492 causing it to conduct and discharge the horizontal sawtooth condenser 493.

The negative pulse output of generator 500 (Fig. 5*d*) is applied via lead U to the synch mixing network 431 (Fig. 5*a*) in the synch insertion circuits 43 (Fig. 5*a*). A negative pulse from the cathode resistor of the heptode section of the vertical flyback pulse generator 471 (Fig. 5*c*) is applied via lead T to the same network 431 (Fig. 5*a*). These pulses are mixed in the synch mixer 430 (Fig. 5*a*) with the reading signal from the sorting circuits 42 to form a composite signal which is amplified in an amplifier 432 and coupled to the receiver by means of a telephone line, radio link, or wire cable 18.

The number of amplifier stages provided in the preferred embodiment of the invention illustrated in Figure 5 may be reduced if sufficient amplification is obtainable with fewer stages, but in reducing the number of amplifier stages, attention must be paid to maintaining correct signal and pulse polarities.

Other types of camera tubes, such as storage tubes, image orthicons or similar devices, may be substituted for the vidicon 400.

What is claimed is:

1. Apparatus for automatically reducing the speed of scan over picture areas containing video information comprising, in combination, means for scanning a picture area for converting video information in said picture area into video signals, means for deriving from said scanning a sampling signal of substantially lower amplitude than a certain value when a picture area containing no video information is scanned and of substantially higher amplitude than said certain value when the picture area containing video information is scanned, means for deriving a reading signal from said scanning substantially identical with said sampling signal, said sampling signal preceding said reading signal, means for converting said sampling signal to a control signal having a lower level of amplitude and a higher level of amplitude corresponding, respectively, to said lower and higher amplitudes of said sampling signal, said converting means including means for making said control signal have said higher level of amplitude in response to the video signals having at least a certain amplitude and have said higher level substantially for the duration of the video signals having at least said certain amplitude, means responsive to said higher level of amplitude of said control signal to reduce the scanning speed substantially for the duration of said higher level of amplitude, and means for utilizing said reading signal.

2. Apparatus in accordance with claim 1, including means for generating indicating signals whenever said scanning extends beyond predetermined limits of said picture area, and means responsive to said indicating signals to reinitiate said scanning from predetermined starting points.

3. Apparatus for automatically reducing the speed of scan over picture areas containing video information comprising, in combination, means for scanning a picture area by an electron beam whose motion in each horizontal sweep across said picture area is a series of translational movements having a resultant average linear horizontal movement in one direction, means for deriving a sampling signal from said scanning, means for deriving a reading signal from said scanning substantially identical with said sampling signal, said sampling signal preceding said reading signal, means for utilizing said sampling signal to reduce the scanning speed whenever said sampling signal contains video information, and means for utilizing said reading signal.

4. Apparatus for automatically reducing the speed of scan over picture areas containing video information comprising, in combination, means for scanning a picture area by an electron beam whose motion in each horizontal sweep across said picture area is a series of horizontal, translational movements about an average position which moves linearly across said picture area, means for deriving a sampling signal from said scanning, means for deriving a reading signal from said scanning substantially identical with said sampling signal, said sampling signal preceding said reading signal, means for utilizing said sampling signal to reduce the speed of movement of the average position of said sweep whenever said sampling signal contains video information, and means for utilizing said reading signal.

5. Apparatus for automatically reducing the speed of scan over picture areas containing video information comprising, in combination, means for scanning a picture area by an electron beam, said beam being deflected horizontally by a scanning signal which is a sawtooth signal modulated by a sine wave signal of higher frequency than that of said sawtooth, means for generating gating signals synchronized with the regions of maximum and minimum amplitude of said sine wave, means for deriving a sampling signal from said scanning, the time of derivation of said sampling signal coinciding with said regions of maximum amplitude of said sine wave, means for deriving a reading signal from said scanning substantially identical with said sampling signal, the time of derivation of said reading signal coinciding with said regions of minimum amplitude of said sine wave, means for coupling said means for generating gating signals to said means for deriving said sampling signal and to said means for deriving said reading signal, means for utilizing said sampling signal to reduce the scanning speed whenever said sampling signal contains video information, and means for utilizing said reading signal.

6. Apparatus for automatically reducing speed of scan over picture areas containing video information comprising, in combination, first means responsive to scanning signals for scanning a picture area by a first electron beam and deriving a first output signal therefrom, second means responsive to scanning signals for scanning an identical picture area by a second electron beam and deriving a second output signal therefrom, means for causing said scanning of said first electron beam to precede said scanning of said second electron beam by a fixed time interval, means for generating horizontal and vertical scanning signals and applying said scanning signals to simultaneously deflect said first and second electron beams, said scanning signals being common to both of said electron beams, means for reducing the speed of scan whenever said first electron beam encounters areas of said picture containing video information, means for obtaining indicating signals whenever said second electron beam completes a horizontal scan and whenever said beam completes a vertical scan of said picture, means for applying said indicating signals to said means for generating horizontal scanning signals so as to return both of said electron beams to their initial positions for starting a horizontal scan of said picture, and means for applying said indicating pulses to said means for generating vertical scanning signals so as to return both of said electron beams to their initial positions for starting a vertical scan of said picture.

7. Apparatus for automatically reducing speed of scan over picture areas containing video information comprising, in combination, means for scanning a picture area by an electron beam and deriving an output signal therefrom, means for generating a horizontal scanning signal, means for generating a sine wave signal having a frequency which is greater than the frequency of said horizontal scanning signal, means for applying said sine wave signal to said horizontal scanning signal and obtaining a modulated horizontal scanning signal therefrom, means for generating a vertical scanning signal, means for applying said modulated horizontal scanning signal and said vertical scanning signal to said scanning means, a first amplifying means, a second amplifying means, means for applying said output signal from said scanning means to said first and second amplifying means, means for generating a first gating signal and a second gating signal, said first gating signal being applied to said first amplifying means in such manner as to permit transmission therethrough of said output signal from said scanning means only when said sine wave modulating said horizontal scanning signal is substantially at its maximum amplitude in each cycle, thereby deriving a sampling signal therefrom, and said second gating signal being applied to said second amplifying means in such manner to permit transmission therethrough of said output signal from said scanning means only when said sine wave is substantially at its minimum amplitude in each cycle, thereby deriving a reading signal therefrom, means adapted to reduce the rates of increase of said horizontal and said vertical scanning signals whenever said sampling signal contains video information, and means for coupling said sampling signal to said means for reducing the rates of increase of said scanning signals.

8. Apparatus in accordance with claim 7, including means for generating a third gating signal operative to produce periods of operation of said electron beam coincident in time with the periods of operation of said first and said second amplifying means, and means to couple said third gating signal to said scanning means.

9. Apparatus in accordance with claim 7, including means for amplifying said reading signal.

10. Apparatus in accordance with claim 7, including means for generating indicating signals whenever said scanning extends beyond the limits of said picture area, and means responsive to said indicating signals for reinitiating said scanning from predetermined starting points.

11. In a television apparatus, means for electronically deriving from a picture area signals indicative of the amplitudes of successive bits of the picture, said means including scanning means for scanning successive bits of the picture area, sampling means for sampling successive bits of the picture area for producing a sampling signal, means under the control of said sampling signal for scanning at one speed while substantially no video information is present in the area scanned and for scanning at a different speed during substantially the entire time that video information is present in the area scanned.

12. In a television apparatus, means for electronically deriving from a picture area signals indicative of the amplitudes of successive bits of the picture, said means including scanning means for scanning successive bits of the picture area, sampling means for sampling successive bits of the picture area for producing a sampling signal, means under the control of said sampling for scanning at one speed while substantially no video information is present in the area scanned and for scanning at a slower speed during substantially the entire time that video information is present in the area scanned.

13. A television system comprising, means for electronically deriving from a picture area signals indicative of the amplitudes of successive bits of the picture, said means including scanning means for scanning successive bits of the picture area, and sampling means for sampling successive bits of the picture area for producing a sampling signal, means under the control of said sampling signal for scanning at one speed while substantially no video information is present in the area scanned and for scanning at a slower speed during substantially the entire time that video information is present in the area scanned; means for transmitting said signals; and means responsive to the transmitted signals for reproducing said picture.

14. A television system comprising, means for electronically deriving from a picture area signals indicative of the amplitudes of successive bits of the picture, said means including scanning means for scanning successive bits of the picture area, sampling means for sampling successive bits of the picture area for producing a sampling signal, means under the control of said sampling signal for scanning at one speed while substantially no video information is present in the area scanned and for scanning at a slower speed during substantially the entire time that video information is present in the area scanned; means for transmitting said signals; means for delaying a portion of said transmitted signals, and means responsive to the delayed transmitted signals for reproducing said picture area including a visual screen, said last means including scanning means for scanning said screen, means for obtaining a relatively undelayed portion of said transmitted signals to produce a second sampling signal, means under the control of said second sampling signal for scanning said screen at one speed while no video information is present in the picture area scanned and for scanning at a slower speed during substantially the entire time that video information is present in the picture area scanned.

15. A television system comprising, means for electronically deriving from a picture area signals indicative of the amplitude of successive bits of the picture, said means including scanning means for scanning successive bits of the picture area, sampling means for sampling successive bits of the picture area for producing a sampling signal, means under the control of said sampling signal for scanning at one speed while substantially no video information is present in the area scanned and for scanning at a slower speed during substantially the entire time that video information is present in the area scanned; means for transmitting said signals; and means responsive to the transmitted signals for reproducing said picture area comprising a cathode ray tube indicator including a deflectable electron beam, means for intensity modulating said beam in accordance with said signals, means for scanning said beam across the screen of said indicator, and means responsive to said signals for so controlling the scanning speed of said beam that it corresponds to the speeds at which said picture area is scanned.

16. In combination, a cathode ray beam device having means producing an electron beam, deflecting means responsive to applied voltages for deflecting said beam, and a picture area capable of being scanned by the deflecting beam; means applying an alternating voltage of given amplitude and frequency superimposed on a sweep voltage of substantially larger amplitude and substantially lower frequency to said beam deflecting means so as to sweep said beam across a dimension of said picture area; means for deriving a sampling signal from said beam indicative of the presence of video information on said picture area at times corresponding to the maximum forward excursions of the beam during the beam scanning; and means responsive to said sampling signal for controlling the slope of said sweep voltage.

17. In combination, a cathode ray beam device having means producing an electron beam, deflecting means responsive to applied voltages for deflecting said beam, and a picture area capable of being scanned by the deflecting beam; means applying an alternating voltage of given amplitude and frequency superimposed on a sweep voltage of substantially larger amplitude and substantially lower frequency to said beam deflecting means so as to sweep said beam across a dimension of said picture area; means for deriving a sampling signal from said beam indicative of the presence of video information on said picture area at times corresponding to the maximum forward excursions of the beam during the beam scanning; and means responsive to said sampling signal for decreasing the slope of said sweep voltage in response to the sampling signal indicating the presence of said video information, whereby said beam scans at a slower speed over portions of said picture area where video information is present than over portions where no video information is present.

18. In the combination as set forth in claim 17, said alternating voltage comprising a sine wave.

References Cited in the file of this patent

UNITED STATES PATENTS

| | | |
|---|---|---|
| 2,227,630 | Carnahan | Jan. 7, 1941 |
| 2,359,449 | Shelby | Oct. 3, 1944 |
| 2,664,462 | Bedford | Dec. 29, 1953 |
| 2,798,114 | Schlesinger | July 2, 1957 |
| 2,825,754 | Toulon | Mar. 4, 1958 |

FOREIGN PATENTS

| | | |
|---|---|---|
| 909,949 | France | Jan. 14, 1946 |